US012322057B2

(12) United States Patent
Chen et al.

(10) Patent No.: US 12,322,057 B2
(45) Date of Patent: Jun. 3, 2025

(54) METHOD FOR DIRECT MANIPULATION AND VISUALIZATION OF THE 3D INTERNAL STRUCTURES OF A TUBULAR OBJECT AS THEY ARE IN REALITY WITHOUT ANY NOTICEABLE DISTORTION

(71) Applicants: Chao-Cheng Chen, Tainan (TW); Chao-Yu Chen, Tainan (TW)

(72) Inventors: Chao-Cheng Chen, Tainan (TW); Chao-Yu Chen, Tainan (TW)

( * ) Notice: Subject to any disclaimer, the term of this patent is extended or adjusted under 35 U.S.C. 154(b) by 373 days.

(21) Appl. No.: 17/674,004

(22) Filed: Feb. 17, 2022

(65) Prior Publication Data

US 2022/0284685 A1    Sep. 8, 2022

Related U.S. Application Data

(60) Provisional application No. 63/157,004, filed on Mar. 5, 2021.

(51) Int. Cl.
*G06T 19/20* (2011.01)
*G06T 7/00* (2017.01)
*G06T 7/10* (2017.01)

(52) U.S. Cl.
CPC ............ *G06T 19/20* (2013.01); *G06T 7/0012* (2013.01); *G06T 7/10* (2017.01);
(Continued)

(58) Field of Classification Search
CPC ......... G06T 19/20; G06T 7/0012; G06T 7/10; G06T 2207/30028; G06T 2219/2008;
(Continued)

(56) References Cited

U.S. PATENT DOCUMENTS 4,710,876 A    12/1987 Cline et al.
5,490,239 A    2/1996 Myers
(Continued)

FOREIGN PATENT DOCUMENTS

WO    WO2011030274 A2    1/2012

OTHER PUBLICATIONS

Haker, S., Angenent, S., Tannenbaum, A. and Kikinis, R., 2000. Non-distorting flattening for virtual colonoscopy. In Medical Image Computing and Computer-Assisted Intervention—MICCAI 2000: Third International Conference, Pittsburgh, PA, USA, Oct. 11-14, 2000. Proceedings 3 (pp. 358-366). Springer Berlin Heidelb.*

(Continued)

*Primary Examiner* — Zhitong Chen
(74) *Attorney, Agent, or Firm* — Best & Flanagan LLP

(57) ABSTRACT

In many applications, the assessment of the internal structures of tubular structures (such as in medical imaging, blood vessels, bronchi, and colon) has become a topic of high interest. Many 3D visualization techniques, such as "fly-through" and curved planar reformation (CPR), have been used for visualization of the lumens for medical applications. However, all the existing visualization techniques generate highly distorted images of real objects. This invention provides direct manipulation based on the centerline of the object and visualization of the 3D internal structures of a tubular object without any noticeable distortion. For the first time ever, the lumens of a human colon is visualized as it is in reality. In many medical applications, this can be used for diagnosis, planning of surgery or stent placements, etc. and consequently improves the quality of healthcare significantly. The same technique can be used in many other applications.

16 Claims, 8 Drawing Sheets

(52) U.S. Cl.
CPC .............. *G06T 2207/30028* (2013.01); *G06T 2219/2008* (2013.01); *G06T 2219/2016* (2013.01)

(58) Field of Classification Search
CPC ......... G06T 2219/2016; G06T 2210/41; G06T 2219/008; G06T 19/00; G06T 17/00
See application file for complete search history.

(56) References Cited

U.S. PATENT DOCUMENTS 8,562,340 B2   10/2013   Chishti et al.
9,019,272 B2    4/2015   Nijlunsing

OTHER PUBLICATIONS

Van Uitert, R.L. and Summers, R.M., 2007. Automatic correction of level set based subvoxel precise centerlines for virtual colonoscopy using the colon outer wall. IEEE transactions on medical imaging, 26(8), pp. 1069-1078.*
Wan, M., Liang, Z., Ke, Q., Hong, L., Bitter, I. and Kaufman, A., 2002. Automatic centerline extraction for virtual colonoscopy. IEEE transactions on medical imaging, 21(12), pp. 1450-1460.*
Wyatt, C.L., Ge, Y. and Vining, D.J., 2006. Segmentation in virtual colonoscopy using a geometric deformable model. Computerized Medical Imaging and Graphics, 30(1), pp. 17-30.*

* cited by examiner

METHOD FOR DIRECT MANIPULATION AND VISUALIZATION OF THE 3D INTERNAL STRUCTURES OF A TUBULAR OBJECT AS THEY ARE IN REALITY WITHOUT ANY NOTICEABLE DISTORTION

BACKGROUND OF THE INVENTION

In many applications, such as medical applications, the assessment of the lumens of tubular structures (such as in medical imaging, blood vessels, bronchi, and colons) has become a topic of high interest. Many 3D visualization techniques, such as fly-through (or virtual endoscopy) and curved planar reformation (CPR), have been used for visualization of the lumens for medical applications. For example, the ability to navigate automatically through a colon with a 3D view and obtain CPR images with 2D axial, coronal, and sagittal views is standard on the software platforms of most commercially available computed tomography (CT)/magnetic resonance Imaging (MRI)/computed tomography angiography (CTA)/magnetic resonance angiography (MRA) machines. Physicians' experience with fly-through techniques and CPR images is continuing to grow over time and is gradually becoming common practice in clinical settings.

However, the disadvantages of fly-through include the following: (1) The virtual camera's FOV (field of view) is limited and hence results in low surface visibility coverage. Consequently, many blind spots are invisible unless a physician is willing to spend a lot of time searching through the entire colon. (2) Navigation must be done in both antegrade and retrograde directions to maximize the visualized surface areas, and hence, it is very time consuming. (3) It is difficult to visualize small polyps that may be hidden around the folds. (4) Since the lumens of the colon are always irregular in shape, it is very easy to become disoriented, (5) Since a perspective projection is used, perspective distortion is inevitable, particularly when the location of the virtual camera has to be limited within a very short distance of the lumen. (6) Since the overall lumen of the object is not available, it is not easy to detect whether the tubular object gradually becomes narrower or wider. This is particularly important for vessel applications.

CPR, a well-established technique in the medical community, can be used to re-sample and visualize a data set according to the central axis of an object. Different properties (i.e., minimal and maximal vessel diameters, average attenuation) can be estimated and displayed. However, its disadvantages include the following: (1) Since this technique is based on geometric mapping, geometric distortion is inevitable. As a result, important diagnostic features may be changed or even eliminated. (2) Although these images are 3D views of a 3D object, they are really static 2D images and cannot be interactively rotated and viewed from different perspectives in order to reveal the true shape of the lumens. There are thus many blind spots in the haustral folds that cannot be seen. (3) Since the flattened image is in fact a distorted one, physicians may waste a lot of time investigating false suspicious areas that are in fact perfectly normal.

In medical applications, important properties, such as length preservation and direct visualization of the 3D lumens of a tubular object without any noticeable distortions, cannot be achieved. All the existing visualization techniques generate highly distorted images of real objects. These problems have been longstanding, and solutions are long overdue.

BRIEF SUMMARY OF THE INVENTION

This invention is a method (or an algorithm) that uses a computer to model a tubular 3D object (for example, in medical applications, such as blood vessels, bronchi, and colon that are irregular in shape) in reality. The method automatically obtains the "shell" of a tubular object and provides direct manipulation and visualization of the 3D internal structures of the tubular object without any noticeable distortion. The shell of the tubular object can be an outer shell or an inner shell depending on the needs of applications. The outer shell is the outside edge of the boundary layer of the object, and the inner shell of the object is the inside edge of the boundary layer. Both shells can be further processed depending on the needs of applications. Originally the shell may be curved around in 3D space, such as a colon. The method can further automatically partition the shell, based on the centerline of the object, into several different object segments, each of which is similar in shape to a straight tube and can be easily processed separately. These object segments can have some overlapping areas, if they are viewed separately, to provide enough coverage of the 3D internal structure. Further manipulation of each individual segment can be done by cutting the object model with a mask to mask out some parts or with cutting planes, or using other manipulation methods to remove some parts and reveal the 3D internal structures. Once some parts of the object are removed the virtual camera can be located anywhere for image generation, instead of being limited to locations within the interior of the object, in order to keep projection distortion of the image generation to a minimum. The resultant objects reveal the internal structures of the original tubular, curved 3D object and can be interactively visualized in real-time using a personal computer or a mobile device. In medical applications, this can be used for diagnosis, planning of surgery or stent placements, etc. and consequently may significantly improve the quality of healthcare. The same technique can be used in many other applications.

DETAILED DESCRIPTION OF THE INVENTION

0. Set up the input data. The tubular and curved 3D object may be encoded with a surface-based representation (such as a set of triangles) or a voxel-based representation (such as a binary voxel object). If the surface representation is used, a voxelization algorithm can be used to obtain its voxel representation. Therefore, we can assume that the tubular object is a binary voxel object. In general, a tubular object may have several branches, such as a 3D vessel structure in a medical application, each of which can be viewed as another single tubular object. Without loss of generality, we consider the tubular object to be only a single tubular object without any branches since we can process each branch or a series of consecutive branches individually as far as the visualization of the 3D lumen is concerned.

Figure 1:
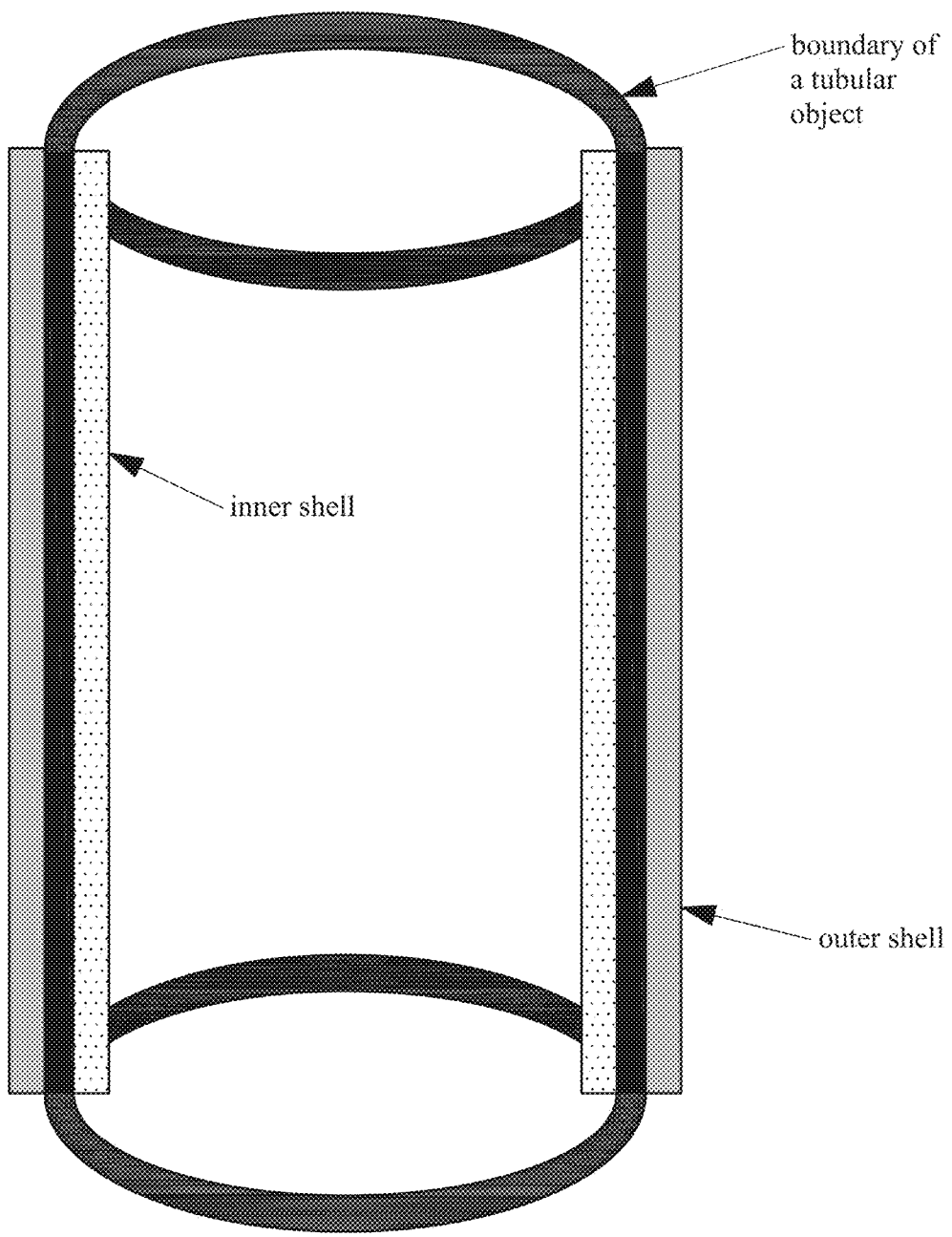
FIG. 1 is the definition of the outer shell and the inner shell of the boundary of the 3D tubular object.

1. Compute the "shell" of the object. The "shell" can be an "outer shell" or an "inner shell". The "outer shell" is the outside edge of the boundary layer of the object, and the "inner shell" is the inside edge of the boundary layer as shown in FIG. 1. The "outer shell" of the object can be obtained using the following steps: For the generation of the "shell", two 3D voxel scenes (i.e., two 3D arrays), representing the overall 3D scene, are created first: One is called the "A scene", for the binary representation of the colon, where each voxel is represented as either 1 or 0 depending on whether the voxel is part of the colon or not; the other is called the "B scene" and is an empty 3D voxel scene where the generated "shell" will be stored. The algorithm for generating the "shell" is simple and easy to implement. We start from obtaining the "outer shell" first. (1) Scan through the entire "A scene" in a slice-by-slice, row-by-row fashion. (2) If a voxel is 0, do nothing, and go to the next voxel. (3) If a voxel is 1 (i.e., an object voxel), check its 6, 18, or 26 connected voxels depending on the definition of connectivity or the needs of the applications. If a checked voxel is 0, this means that the current voxel is a boundary voxel, and the checked voxel is right next to the boundary voxel and is a part of the "outer shell". Therefore, its corresponding voxel in the "B scene" will be set to 1. If the checked voxel is 1, this means that the voxel is a part of the tubular object, and can not be a part of the outer shell. Therefore, the voxel can be ignored. (4) When all the voxels in the "A scene" have been scanned, the resultant voxels in the "B scene" are the voxels of the "outer shell". One can also obtain the "inner shell" by simply modifying the Step (3) above: (3) If a voxel is 1 (i.e., an object voxel), check its 6, 18, or 26 connected voxels. If a checked voxel is 0, this implies that current voxel is a boundary voxel. All the 6, 18, or 26 connected voxels of the current voxel with a 1 value (i.e., the object voxels) are further checked. If all the connected voxels of a checked voxel have a 1 value, this means that the checked voxel is an internal voxel, and is a part of the "inner shell". Therefore, its corresponding voxel in the "B scene" will be set to 1. Otherwise, the checked voxel is ignored. Depending on the needs of applications, both shells may have different meanings. However, both are suitable for the subsequent processes.

Since there may be some empty holes inside the colon (in the "A scene") due to some stools, etc., in practice, the results stored in the "B scene" may have several additional components (noise) instead of only one "shell", which is called an "SC" A simple connected component algorithm can be used to obtain only the "SC".

Figure 2:
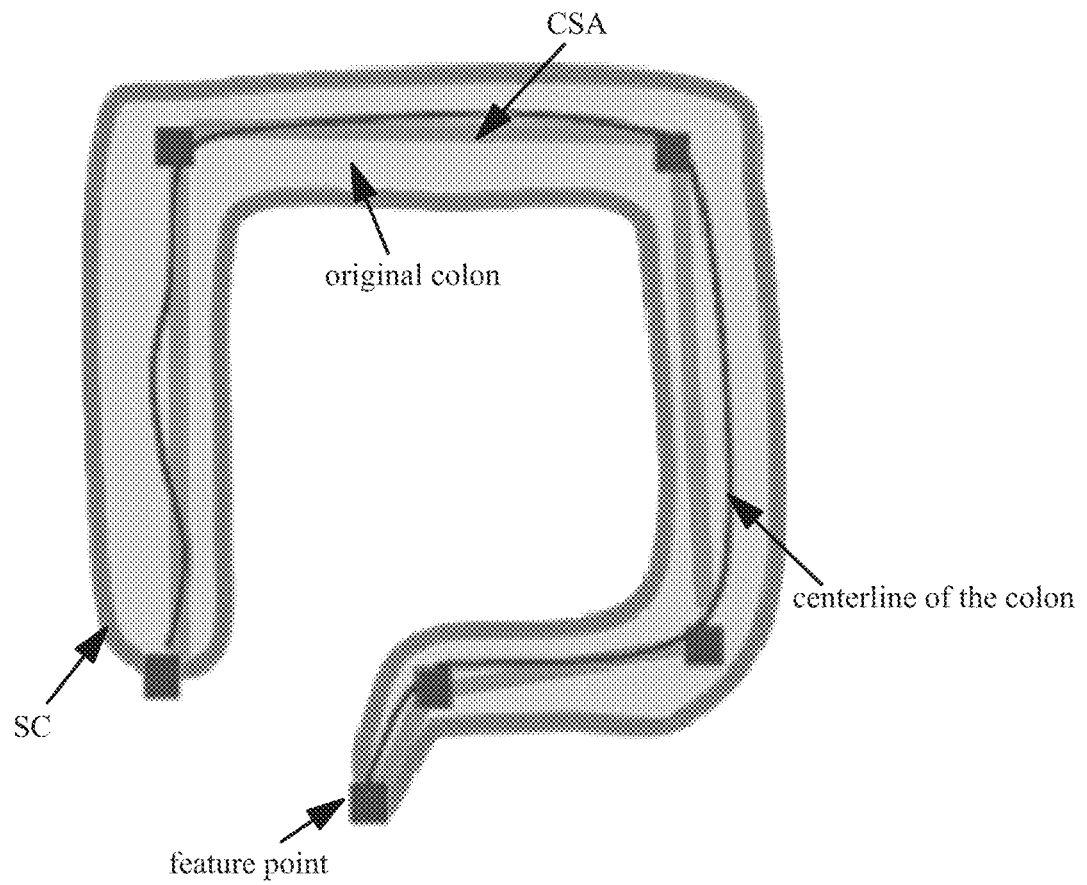
FIG. 2 is a schematic picture of a colon used to explain the various terms used in this invention. The overall shape is the original colon, and the outer thick outline is the "shell" of the colon (SC). The central curve is the centerline of the colon. The squares are the feature points of the centerline. The central straight lines are the CSAs, each of which connects two consecutive feature points.

2. Compute the centerline. The centerline of the object can be computed using any thinning algorithm. FIG. 2 is a schematic picture of a colon as an example.

3. Digitize the centerline. The centerline is converted to a digital version of the centerline, called a VP, using a feature point algorithm that can extract feature points (i.e. points with a high curvature) to represent the original centerline. Some parameters in the feature point algorithm that determine the locations and number of the feature points can be selected according to the needs of final applications. Every two consecutive feature points of the centerline form a line segment, called a CSA, as shown in FIG. 2. In other words, the series of CSAs of the centerline is used to approximate the original centerline for further processes. The VP consists of a sequence of CSA vectors, each of which represents a segment of an object that is similar to a straight tube. Obviously the parameters in the feature point algorithm also determine the lengths of each CSA. Each segment represented by its corresponding CSA can be further processed individually to simplify the overall processes.

4. Manipulate each segment of the object.

Figure 3:
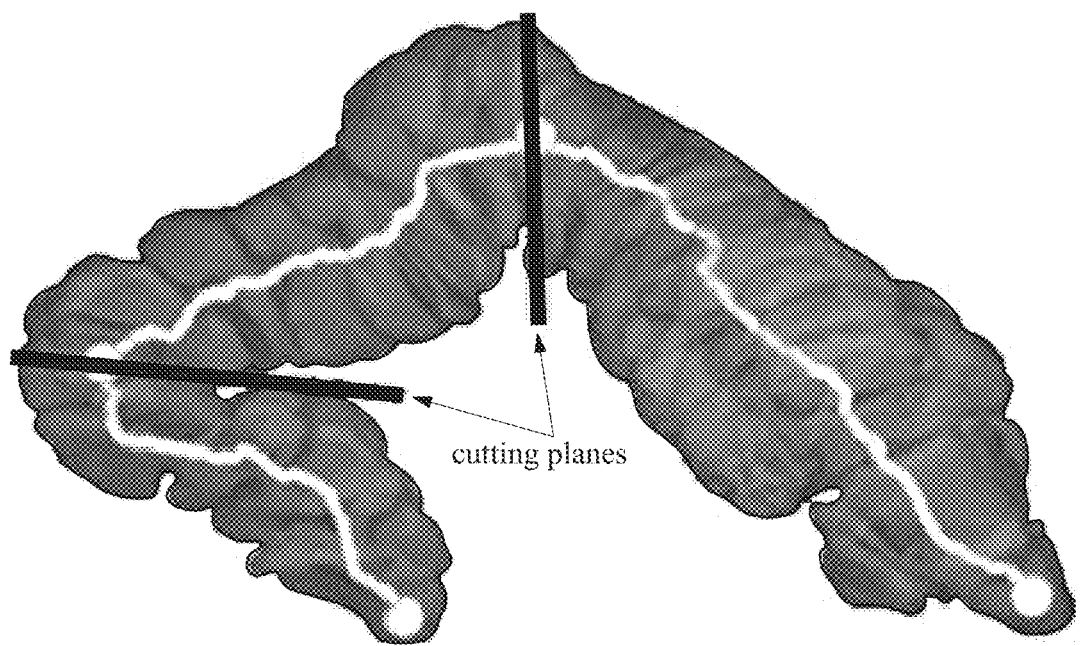
FIG. 3 explains how the cutting planes are used to cut a colon into several segments.
Figure 4:
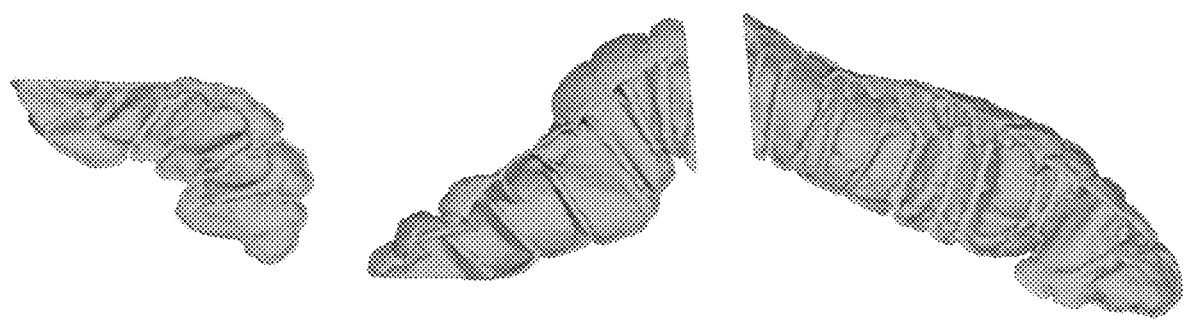
FIG. 4 shows the three colons that are cut in half to reveal the lumens of the colon segments.
Figure 5A:
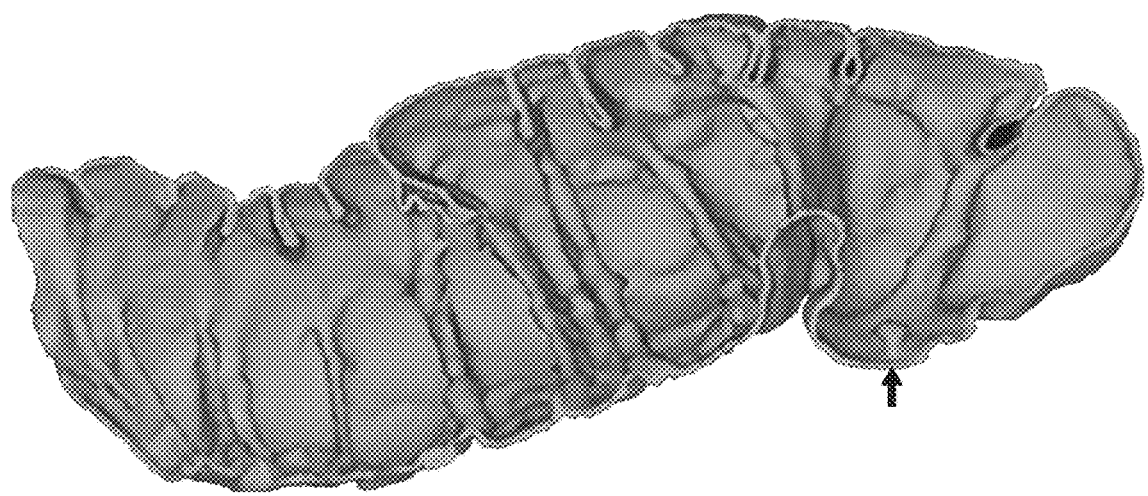
FIG. 5 (A), (B), and (C) are the resultant images with different perspectives and are displayed interactively, where the polyp can be seen clearly in real-time using a personal computer or a mobile device.
Figure 5B:
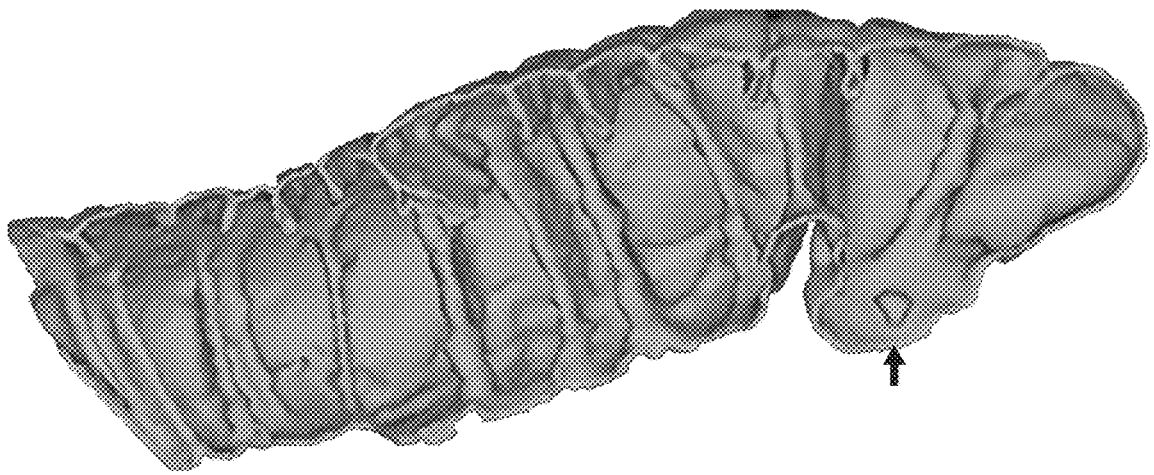
Figure 5C:

(a) If the lumen of each segment can be visualized separately, such as a colon case, based on the CSAs, each segment can be cut away from the original object using one of many possible methods, such as a cutting plane to cut away some parts or a mask to mask out some parts. In FIG. 3 a colon is partitioned into three parts. Each object segment can be cut away sequentially. Any cutting plane that can properly cut the object will do. One possible cutting plane at the intersection of two consecutive CSA can be perpendicular to the plane formed by the two CSAs and can go through the angle bisector of the two CSAs. After the cutting operation is completed, a connected component algorithm can be used to extract the segment that needs to be cut away (since there may be many components after the cutting operation). Each segment can be further processed individually, as shown in FIG. 3 and FIG. 4, in which each of the three colon segments is cut in half by another cutting plane. This cutting plane can go through the corresponding CSA of the colon segment in order to cut the segment in half. Each resultant object is a 3D object that can be interactively visualized using a computer or a mobile device. The resultant images shown in FIG. 5 have no noticeable distortion and are much better than those generated using fly-through or CPR methods.

Figure 6:
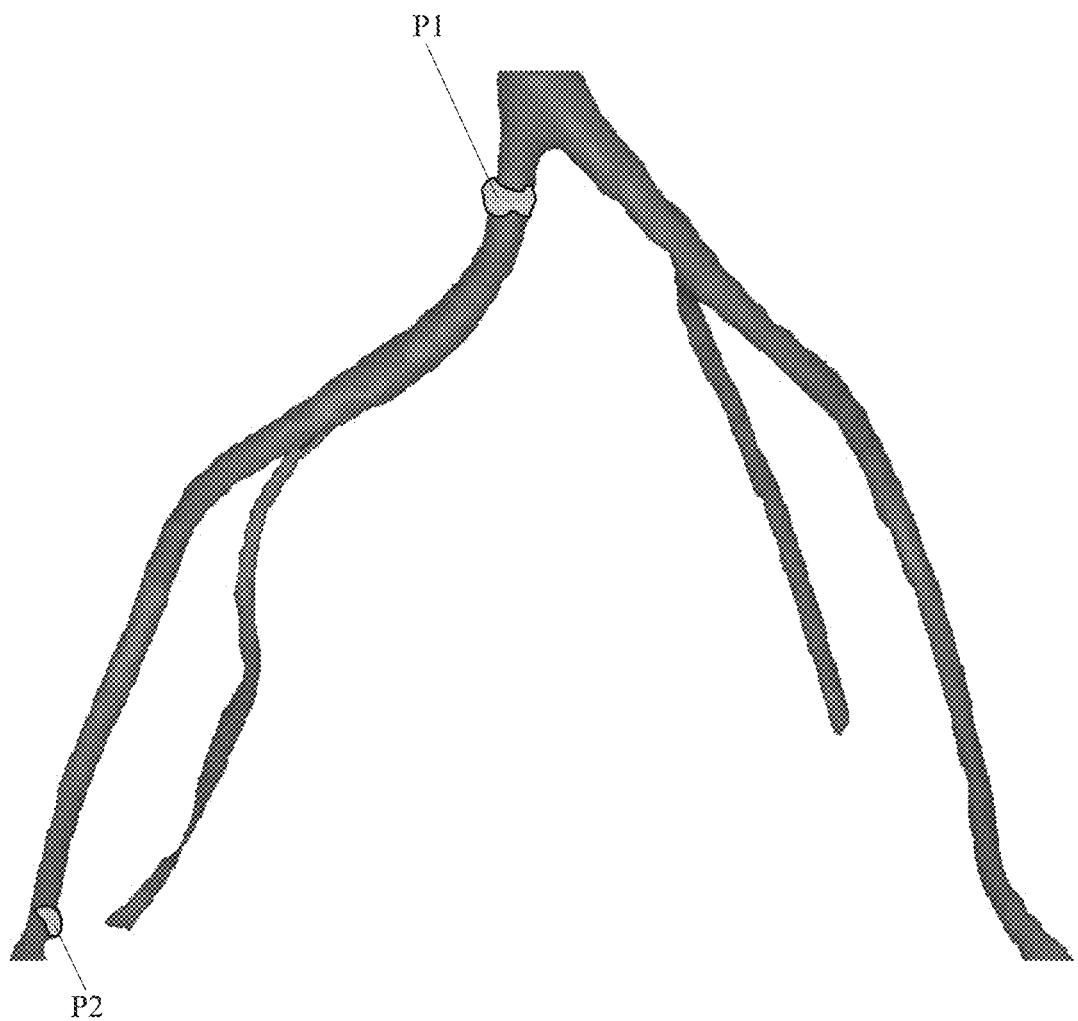
FIG. 6 shows two set points P1 and P2 specified by the user to indicate the vessel segments of interest.
Figure 7:
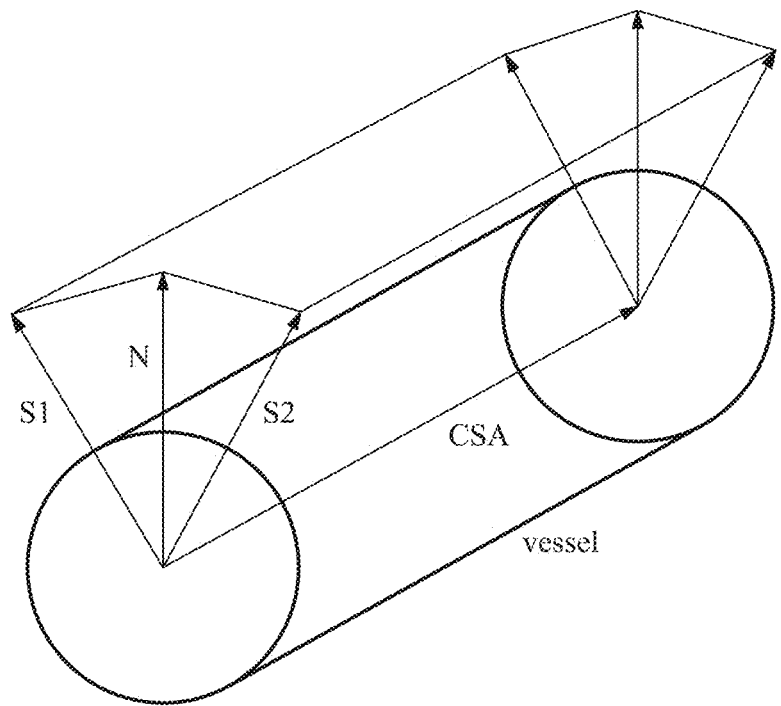
FIG. 7 explains how an incision of a vessel segment can be made using a wedge-shaped mask that can be used to mask out some parts of the vessel.
Figure 8:
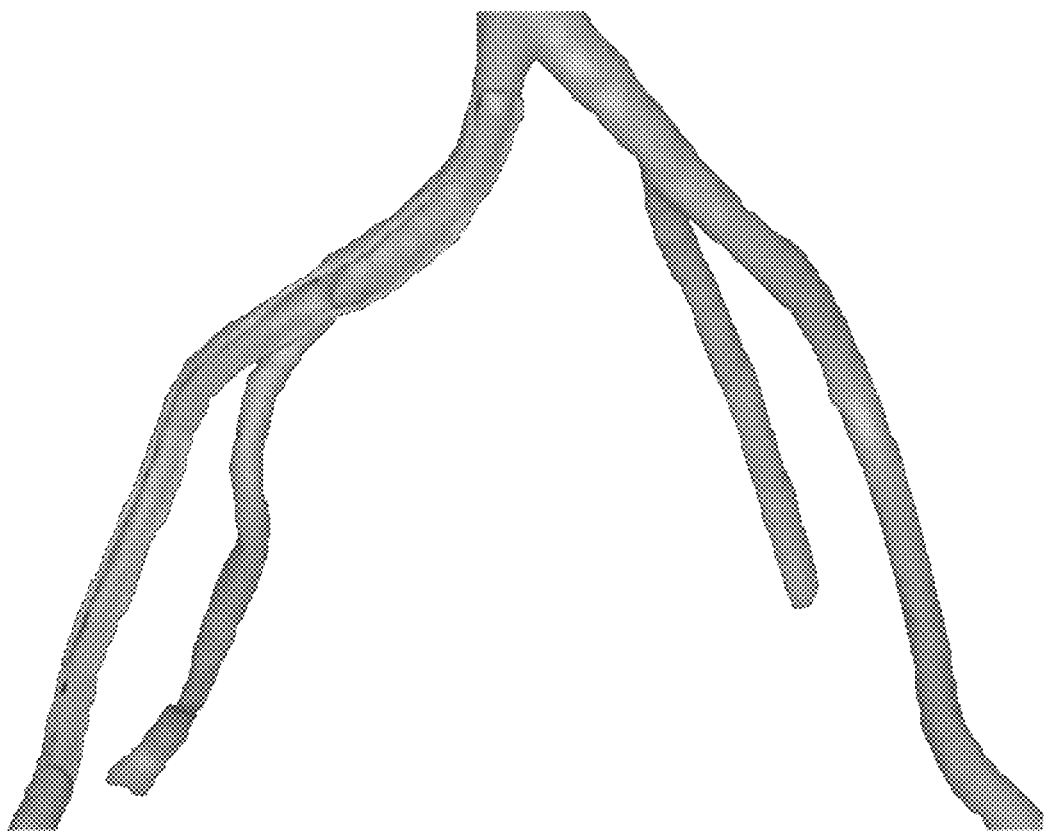
FIG. 8 is the resultant vessel where the lumens are shown.

(b) If the internal structures of the object should be shown in its original location in the object (i.e., the tubular object can not be segmented for visualization purposes), such as a vessel structure, each segment can still be processed separately at that location since the centerline has been converted into a series of CSAs. The internal structures of the object segments of interest is specified by a user as shown in FIG. 6. In order to reveal the internal structures of each segment of interest, an incision must be made on the surface of the vessel. For medical applications, this incision is the main difference between a traditional real/virtual endoscopy and this invention. In a traditional real/virtual endoscopy, a real/virtual camera is placed inside the tubular object for visualization purposes. Since the distance between the camera and the region of interest is too short, this results in highly distorted images. Furthermore, since the field of view and the visible space of the lumens are limited inside the tubular object, it is also difficult to visualize the overall morphology of the lumens. With the incision on the surface of the tubular object, the virtual camera can be placed at any location from any perspective as long as the region of interest is visible through the incision. Furthermore, the overall morphology can be easily visualized, Since the object may curve around in 3D space, for each CSA representing each object segment, a wedge-shaped sub-mask can be generated to mask out some parts of the corresponding segment to make an incision on the object surface, as shown in FIG. 7. The N is the called the normal of the sub-mask. The N and the angle between the S1 and S2 can be determined by the needs of final applications. In order to visualize the internal structures head-on, the N can be aligned with the viewpoint. The length of a sub-mask can be extended to avoid an aliasing effect. All the sub-masks involved will be in a voxel form and form a final mask through union operations of all the sub-masks. Subsequently an overall incision on the surface of the tubular object is generated by a subtraction operation between the final mask and the "SC" (a "shell" without noise) of the tubular object generated in Step 0 "1. Compute the "shell" of the object. The "shell" can be an "outer shell" or an "inner shell". The "outer shell" is the outside edge of the boundary layer of the object, and the "inner shell" is the inside edge of the boundary layer as shown in FIG. 1. The "outer shell" of the object can be obtained using the following steps: For the generation of the "shell", two 3D voxel scenes (i.e., two 3D arrays), representing the overall 3D scene, are created first: One is called the "A scene", for the binary representation of the colon, where each voxel is represented as either 1 or 0 depending on whether the voxel is part of the colon or not: the other is called the "B scene" and is an empty 3D voxel scene where the generated "shell" will be stored. The algorithm for generating the "shell" is simple and easy to implement. We start from obtaining the "outer shell" first. (1) Scan through the entire "A scene" in a slice-by-slice, row-by-row fashion. (2) If a voxel is 0, do nothing, and go to the next voxel. (3) If a voxel is 1 (i.e., an object voxel), check its 6, 18, or 26 connected voxels depending on the definition of connectivity or the needs of the applications. If a checked voxel is 0, this means that the current voxel is a boundary voxel, and the checked voxel is right next to the boundary voxel and is a part of the "outer shell". Therefore, its corresponding voxel in the "B scene" will be set to 1. If the checked voxel is 1, this means that the voxel is a part of the tubular object, and can not be a part of the outer shell. Therefore, the voxel can be ignored, (4) When all the voxels in the "A scene" have been scanned, the resultant voxels in the "B scene" are the voxels of the "outer shell"." described above (since both the shell and the mask are in a voxel form). The resultant objects can be displayed using a Marching-cube algorithm. The removed parts of the tubular object can also be shown separately if necessary. The results are shown in FIG. 8.

The invention claimed is:

1. A method that uses a computer in communication with a virtual camera to display a tubular bodily object in reality without any noticeable distortion for visualization purposes and without flattening, the tubular bodily object having 3D internal structures inside the tubular bodily object, the method comprises:
creating a 3D object model by automatically computing a shell of the tubular bodily object, wherein the tubular bodily object is selected from the group consisting of blood vessels, bronchi, and colon;
partitioning the shell into multiple segments; selectively removing portions of each segment;
generating a resultant object from each segment, wherein the resultant object is a 3D object; and
subsequently displaying the resultant object of each segment, to reveal the 3D internal structures of the tubular bodily object to the virtual camera without any noticeable distortion.

2. The method of claim 1, wherein the tubular bodily object has a boundary layer on an internal surface of the tubular bodily object, the boundary layer having an outside edge and an inside edge, and the shell is either an outer shell defined by the outside edge of the boundary layer or an inner shell defined by the inside edge of the boundary layer.

3. The method of claim 2, wherein the step of selectively removing portions of each segment can be done by cutting the 3D object model with a mask to mask out some parts or with cutting planes.

4. The method of claim 3, wherein the mask can be generated by generating a sub-mask for each object segment and forming the mask using all the sub-masks.

5. The method of claim 4, wherein the selectively removed portions can be designed to be oriented toward the virtual camera in order to visualize the 3D internal structures of the removed parts head-on.

6. The method of claim 2, wherein the system can automatically partition the shell of the tubular bodily object, based on a centerline of the tubular bodily object, into several different object segments, each of which is similar in shape to a straight tube and can be easily processed separately.

7. The method of claim 6, wherein the step of selectively removing portions of each segment can be done by cutting the 3D object model with a mask to mask out some parts or with cutting planes.

8. The method of claim 7, wherein the mask can be generated by generating a sub-mask for each object segment and forming the mask using all the sub-masks.

9. The method of claim 8, wherein the can be designed to be oriented toward the virtual camera in order to visualize the 3D internal structures of the removed parts head-on.

10. The method of claim 1, wherein the step of selectively removing portions of each segment can be done by cutting the 3D object model with a mask to mask out some parts or with cutting planes.

11. The method of claim 10, wherein the mask can be generated by generating a sub-mask for each object segment and forming the mask using all the sub-masks by union operations.

12. The method of claim 11, wherein the lumens of the selectively removed portions can be designed to be oriented toward the virtual camera in order to visualize the 3D internal structures of the removed parts head-on.

13. A method that uses a computer to create a 3D object model of a tubular bodily object, the tubular bodily object selected from the group consisting of blood vessels, bronchi, and colon, the tubular bodily object having 3D internal structures inside the tubular bodily object, and display the 3D internal structures of the tubular 3D object to a user as they are it is in reality without any noticeable distortion for visualization purposes and without flattening, the method comprising the following steps:
S0. Setting up the input data-and encoding the tubular 3D object in a voxel-based representation;
S1. Automatically computing a shell of the tubular 3D object, wherein the shell has a boundary layer on an internal surface of the tubular 3D object, the boundary layer having an outside edge and an inside edge, and the shell is either an outer shell defined by the outside edge of the boundary layer or an inner shell defined by the inside edge of the boundary layer;

S2. Computing a centerline;

S3. Digitizing the centerline and partitioning the centerline into several straight lines each of which represents a segment of the object; and S4. Manipulating each segment of the shell based on the centerline of the tubular 3D object by partitioning the shell into multiple segments, selectively removing portions of each segment, and generating a resultant object from each segment, wherein the resultant object is a 3D object and the resultant object of each segment is displayed to reveal to a virtual camera the 3D internal structures as they are in reality without any noticeable distortion.

14. The method of claim 13, wherein if each segment can be examined individually, it can be extended to have some overlaps, with neighboring segments to provide enough coverage for examination.

15. The method of claim 13, wherein selectively removing portions of each segment comprises either cutting with a cutting plane or masking out some parts of the shell with a mask, to delete some parts of the shell to form removed parts and a resultant shell and generate an incision on the shell to reveal the internal 3D structures of the tubular 3D object.

16. The method of claim 15, wherein the selectively removed parts portions and the resultant shell can be displayed to the virtual camera so that the internal 3D structures can be visualized head-on.

* * * * *